United States Patent
Kobayashi et al.

(10) Patent No.: US 7,562,735 B2
(45) Date of Patent: Jul. 21, 2009

(54) PASSENGER DETECTING DEVICE ADAPTED FOR MOTOR VEHICLE

(75) Inventors: Masatoshi Kobayashi, Tokyo (JP);
Takahiro Kawakami, Tokyo (JP);
Noboru Saito, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 40 days.

(21) Appl. No.: 11/642,831

(22) Filed: Dec. 21, 2006

(65) Prior Publication Data

US 2007/0144793 A1    Jun. 28, 2007

(30) Foreign Application Priority Data

Dec. 22, 2005    (JP)    ............... 2005-369743

(51) Int. Cl.
    *B60R 21/015*    (2006.01)
(52) U.S. Cl. .................. 180/273; 280/735; 177/136; 177/144; 177/185; 177/200; 701/45
(58) Field of Classification Search .............. 180/273; 280/735; 701/45; 177/136, 144, 185, 200
    See application file for complete search history.

(56) References Cited

U.S. PATENT DOCUMENTS

| | | | | | |
|---|---|---|---|---|---|
| 3,657,475 | A | * | 4/1972 | Peronneau et al. | 178/18.05 |
| 4,347,903 | A | * | 9/1982 | Yano et al. | 177/25.13 |
| 4,635,739 | A | * | 1/1987 | Foley et al. | 177/45 |
| 4,782,904 | A | * | 11/1988 | Brock | 177/185 |
| 5,220,970 | A | * | 6/1993 | Bachmann | 177/178 |
| 6,058,341 | A | | 5/2000 | Myers et al. | 701/45 |
| 6,557,424 | B1 | * | 5/2003 | Morell | 73/862.045 |
| 6,876,299 | B2 | * | 4/2005 | Sakai et al. | 340/436 |
| 7,039,514 | B2 | * | 5/2006 | Fortune | 701/45 |
| 7,478,699 | B2 | * | 1/2009 | Kobayashi et al. | 180/273 |
| 2004/0016577 | A1 | * | 1/2004 | Lichtinger et al. | 177/144 |

FOREIGN PATENT DOCUMENTS

| | | |
|---|---|---|
| EP | 1 190 916 A2 | 3/2002 |
| EP | 1 411 331 A1 | 4/2004 |
| EP | 1 440 838 A1 | 7/2004 |
| EP | 1 574 401 A1 | 9/2005 |
| JP | 2000-302003 A | 10/2000 |

\* cited by examiner

*Primary Examiner*—Randy W Gibson
(74) *Attorney, Agent, or Firm*—Foley & Lardner LLP

(57) ABSTRACT

A passenger detecting device includes a plurality of weight sensors, a weight-fluctuation monitoring means and a passenger judging and data updating means. The weight sensors are arranged at different positions of a seat for respectively detecting weights acting on the seat of a motor vehicle. The weight-fluctuation monitoring means monitors weight-fluctuation amounts of the plurality of the weight sensors and sum-weight fluctuation amount. The passenger judging and data updating means judges a passenger on the seat to be a large physical-size person or a small physical-size person to update information on the passenger on the seat when the sum-weight fluctuation amount is not less than each of the weight fluctuation amounts, and prevents the information to be updated when at least one of the weight fluctuation amounts is larger than the sum-weight fluctuation amount.

8 Claims, 10 Drawing Sheets

FIG. 5A
| Fi 8 | Fo 8 |
|---|---|
| Ri 12 | Ro 12 |
| Sum 40 | |
FIG. 5B
| Fi 0 | Fo 13 |
|---|---|
| Ri −4 | Ro 29 |
| Sum 38 | |
FIG. 5C
ΔFi=8
ΔFo=5
ΔSum=2 < ΔRi=16
ΔRo=17
→ PASSENGER JUDGMENT IS PREVENTED AND INFORMATION IS MAINTAINED FIG. 7A
| Fi 8 | Fo 8 |
|---|---|
| Ri 12 | Ro 12 |
| Sum 40 | |
FIG. 7B
| Fi 17 | Fo 16 |
|---|---|
| Ri 2 | Ro 3 |
| Sum 38 | |
FIG. 7C
$\Delta Sum = 2 <$ $\Delta Fi = 10$, $\Delta Fo = 7$, $\Delta Ri = 9$, $\Delta Ro = 6$
PASSENGER JUDGMENT IS PREVENTED AND INFORMATION IS MAINTAINED

FIG. 9A

| Fi 8 | Fo 8 |
| --- | --- |
| Ri 12 | Ro 12 |
| Sum 40 | |

FIG. 9B

| Fi 0 | Fo 0 |
| --- | --- |
| Ri 0 | Ro 0 |
| Sum 0 | |

FIG. 9C $\Delta Sum = 40 >$ $\begin{array}{l}\Delta Fi=8\\ \Delta Fo=8\\ \Delta Ri=12\\ \Delta Ro=12\end{array}$

→ PASSENGER JUDGMENT IS MADE AND INFORMATION IS UPDATED

FIG. 10A
| Fi 6 | Fo 6 |
|---|---|
| Ri 10 | Ro 10 |
| Sum 32 | |
FIG. 10B
| Fi 5 | Fo 5 |
|---|---|
| Ri 8 | Ro 8 |
| Sum 26 | |
FIG. 10C
ΔSum=6 >   ΔFi=1
           ΔFo=1
           ΔRi=2
           ΔRo=2
→ PASSENGER JUDGMENT IS MADE AND INFORMATION IS UPDATED

PASSENGER DETECTING DEVICE ADAPTED FOR MOTOR VEHICLE

BACKGROUND OF THE INVENTION

1. Field of the Invention

The present invention relates to a passenger detecting device that is adapted for a motor vehicle and is capable of surely detecting information on a passenger on a seat thereof.

2. Description of the Related Art

A conventional passenger detecting device, adapted for motor vehicle, of this kind is disclosed in Japanese patent laid-open publication No. 2000-302003. This conventional passenger detecting device has a seat belt sensor for detecting whether a seat belt on a seat is fastened or not, and a seat sensor for detecting existence and weight of a passenger on the seat. When the seat belt sensor detects that the seat belt is fastened and the seat sensor detects existence of a passenger on a seat, the weight of the passenger is measured based on an output of the seat sensor. This detected weight data is stored and maintained to judge the passenger to be an adult, a little adult, or a child so that actuation of an air bag can be controlled, based on its judgment result, according to a physical size of the passenger, while the weight data is erased when the seat belt sensor detects unfastening of the seat belts.

The above known conventional passenger detecting device, however, encounters a problem in that information on the passenger on the seat can not be stably and properly obtained in some cases. For example, a child having heavy luggage may get in a motor vehicle and sit on the seat. In this case, when the child fastens the seat belt with the luggage, his or her weight is measured by the seat sensor and the passenger on the seat is judged to be an adult depending on the weight of the luggage. After this judgment, the child is not judged to be a child any longer by the conventional passenger detecting device even when he or she moves the luggage to another seat or another place. In another case, it may not properly detect the weight of a passenger when the passenger fastens a seat belt while a motor vehicle runs, especially, suddenly accelerates and is suddenly braked.

It is, therefore, an object of the present invention to provide a passenger detecting device adapted for motor vehicle which overcomes the foregoing drawbacks and can more stably and properly detect information on a passenger on a seat than the conventional passenger detecting devices.

SUMMARY OF THE INVENTION

According to a first aspect of the present invention there is provided a passenger detecting device that is adapted for a motor vehicle and includes a plurality of weight sensors, a weight-fluctuation monitoring means and a passenger judging and data updating means. The weight sensors are arranged at different positions of a seat for respectively detecting weights acting on the seat of a motor vehicle. The weight-fluctuation monitoring means monitors weight-fluctuation amounts of the plurality of the weight sensors and sum-weight fluctuation amount thereof, based on the weight detected by the plurality of sensors, respectively. The passenger judging and data updating means judges a passenger on the seat to be a large physical-size person or a small physical-size person to update information on the passenger on the seat when the sum-weight fluctuation amount is not less than each of the weight fluctuation amounts, and prevents the information to be updated when at least one of the weight fluctuation amounts is larger than the sum-weight fluctuation amount.

According to a second aspect of the present invention there is provided a passenger detecting method, adapted for a motor vehicle, including the steps of: detecting weights acting on a seat of a motor vehicle by a plurality of weight sensors that are arranged at different positions of the seat, respectively; monitoring weight-fluctuation amounts of the plurality of the weight sensors and a sum-weight fluctuation amount thereof, based on the weights detected by the plurality of the weight sensors, respectively; and judging a passenger on the seat to be a large physical-size person or a small physical-size person to update information on the passenger on the seat when the sum-weight fluctuation amount is not less than each of the weight fluctuation amounts and preventing the information to be updated when at least one of the weight fluctuation amounts is larger than the sum-weight fluctuation amount.

Therefore, the passenger detecting device and the passenger detecting method of the present invention can more stably and properly detect information on the passenger on the seat than the conventional passenger detecting devices.

Preferably, the plurality of the weight sensors are located at a front left position, a front right position, a rear left position and a rear right position of the seat, respectively.

Therefore, the weight sensors can be properly detect the weight of the passenger on the seat, and the passenger can be judged easily and at low manufacturing costs, by using the four weight sensors for detecting the weights acting on the seat at its front left position, its front right position, its rear left position and its rear right position.

Preferably, the plurality of the weight sensors are located on legs of the seat.

Therefore, the weight sensors can be easily fixed to the seat and properly detect the weight of the passenger.

BRIEF DESCRIPTION OF THE DRAWINGS

The objects, features and advantages of the present invention will become apparent as the description proceeds when taken in conjunction with the accompanying drawings, in which:

FIG. 5A is a diagram showing weight values detected by the weight sensors of the seat and their total weight value when the motor vehicle stops or runs on a flat surface road, FIG. 5B is a diagram showing the weight values and the total weight value when the motor vehicle runs on a curved road, and FIG. 5C is a flow of the passenger judging process for judging whether judgment of information on a passenger is to be made or not;

FIG. 7A is a diagram showing weight values detected by the weight sensors and their total weight value when the motor vehicle stops or runs on the flat surface road, FIG. 7B is a diagram showing the weight values and the total weight value when the motor vehicle makes a sudden stop, and FIG. 7C is the flow of the passenger judging process for judging whether the judgment of information on the passenger is to be made or not;

FIG. 9A is a diagram showing weight values detected by the weight sensors and their total weight value when the motor vehicle stops or runs on the flat surface road, FIG. 9B is a diagram showing the weight values and the total weight value when the passengers change his or her seats, and FIG. 9C is the flow of the passenger judging process for judging whether the judgment of information on the passenger is to be made or not; and FIG. 10A is a diagram showing weight values detected by the weight sensors and their total weight value when a child sits on the seat with luggage, FIG. 10B is a diagram showing the weight values and the total weight value when the child moves the luggage from the seat, and FIG. 10C is the flow of the passenger judging process for judging whether the judgment of information on the passenger is to be made or not.

DETAILED DESCRIPTION OF THE PREFERRED EMBODIMENTS

Figure 1:
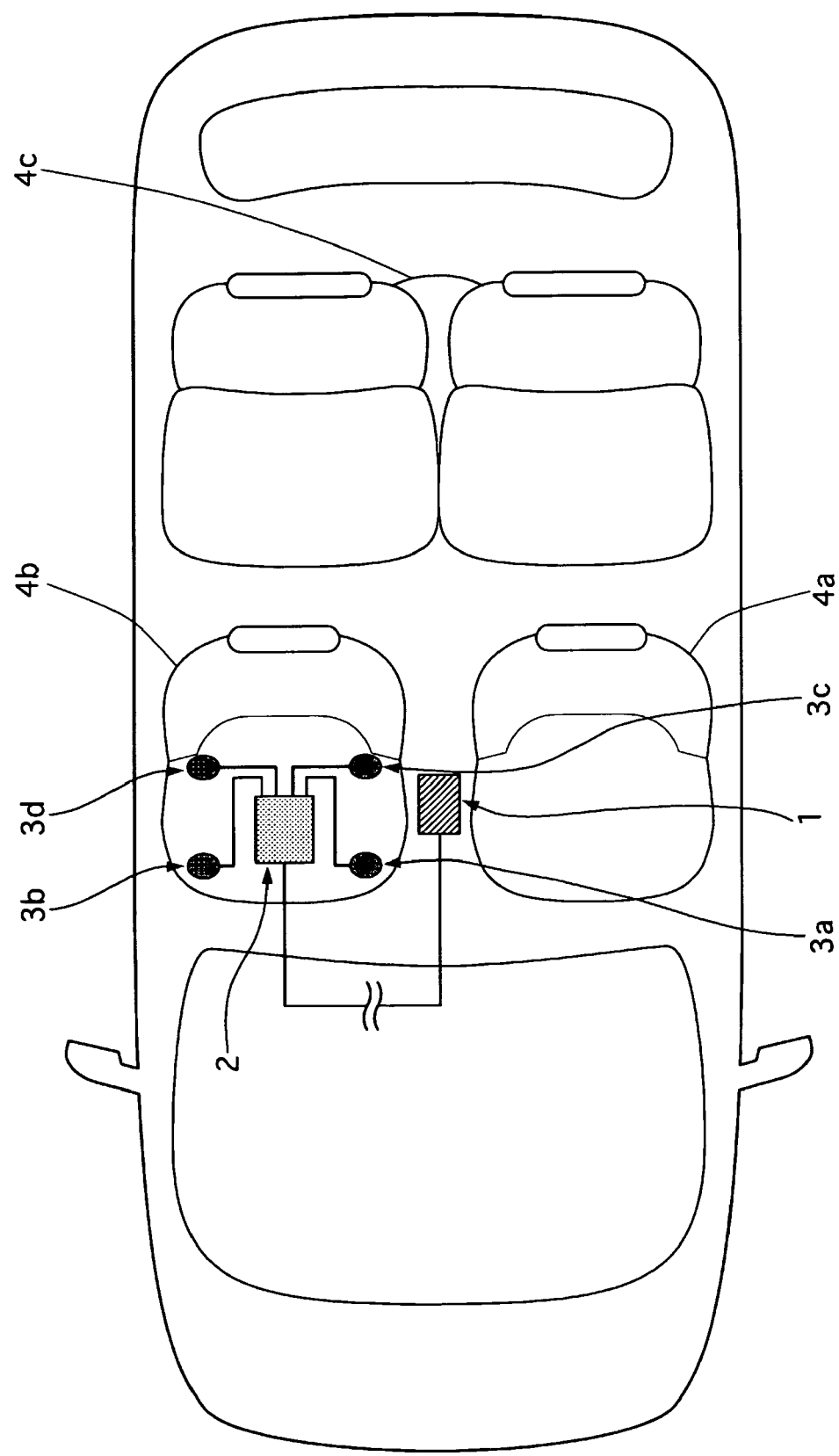
FIG. 1 is a schematic plan view showing a motor vehicle which is equipped with front seats, rear seats and a passenger detecting device, of an embodiment according to the present invention, for detecting information on a passenger on the seat.

Throughout the following detailed description, similar reference characters and numbers refer to similar elements in all figures of the drawings, and their descriptions are omitted for eliminating duplication.

Figure 2:
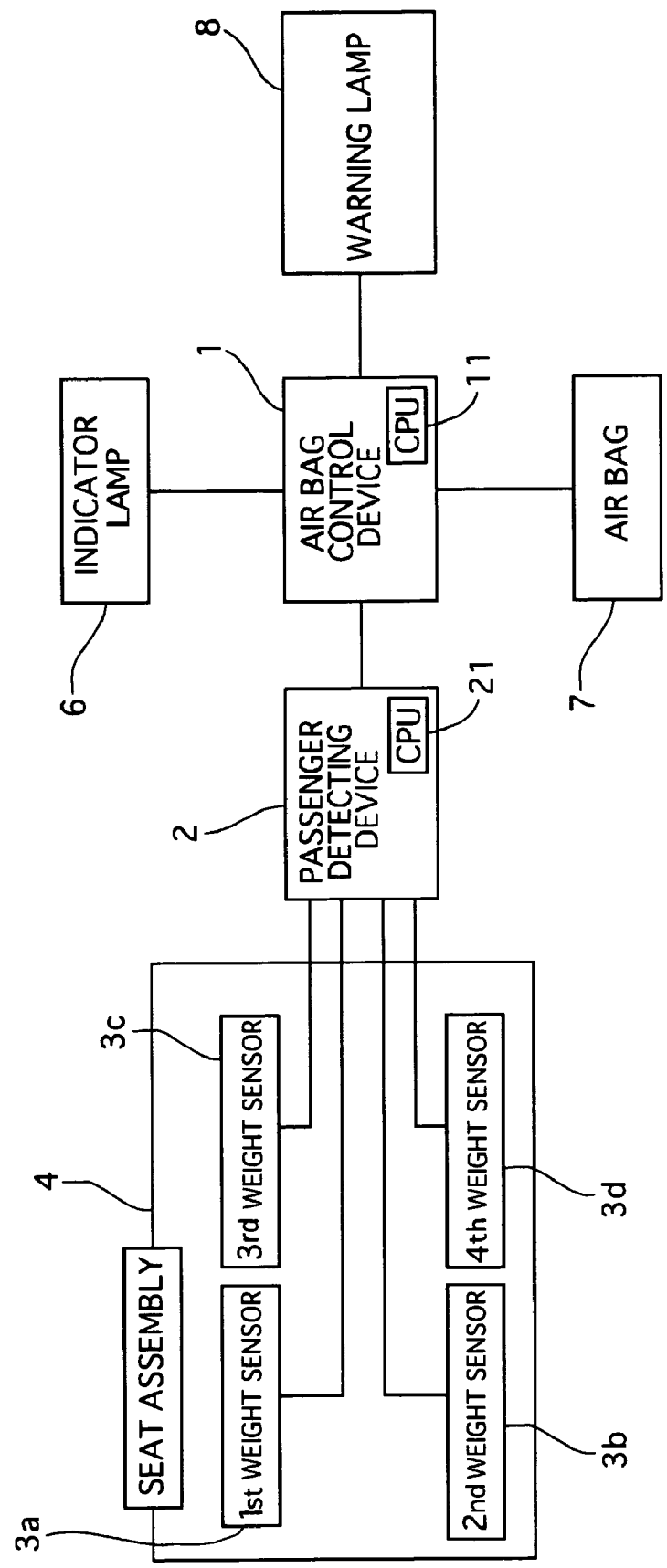
FIG. 2 is a block diagram of the passenger detecting device of the embodiment and its related devices.

Referring to FIGS. 1 and 2 of the drawings, there is shown a passenger detecting device 2, adapted for a motor vehicle, of a first preferred embodiment according to the present invention.

The motor vehicle has a driver seat 4a, a front passenger seat 4b, and a rear passenger seat 4c. The motor vehicle is equipped with an air-bag control unit 1, the passenger detecting device 2, a passenger-detection-state indicator lamp 6, a warning lamp 8, and an air bag 7.

The air-bag control unit 1 has a central processing unit (CPU) 11, and is electrically connected to the passenger detecting device 2, the passenger-detection-state indicator lamp 6, the warning lamp 8, and the air bag 7. The control unit 1 receives a passenger-detection-state signal from the passenger detecting device 2 to judge the passenger to be an adult, a little adult, or a child. The adult corresponds to a large physical-size person of the present invention, and the little adult and the child correspond to a small physical-size person of the present invention.

The control unit 1 is also electrically connected to a not-shown crash sensor to receive a crash signal therefrom in the event of a serious accident. When it receives the crash signal, it controls the air bag 7 so that the air bug, adapted for a seat judged to have no passenger, does not deploy, while the air bag can deploy according to its judgment result, deploying to have a larger volume when the judgment result is an adult and to have a smaller volume when the judgment result is a child or a little adult. Note that the judgment result is this case can be only a small physical-size passenger, not being capable of judging whether he or she is the little adult or the child.

The passenger detecting device 2 has a CPU 21, and is electrically connected with the air-bag control unit 1, a first weigh sensor 3a, a second weight sensor 3b, a third weight sensor 3c and a fourth weight sensor 3d, where the first to fourth weight sensors 3a to 3d are provided on a seat 4 to act as a seat sensor, for example the front passenger seat 4b in this embodiment. The passenger detecting device 2 receives a first weight signal, a second weight signal, a third weight signal and a fourth weight signal from the first to fourth weight sensors 3a to 3d, respectively, to judge a passenger on the seat 4 to be the adult or the child and outputs the passenger-detection-state signal to the air-bag control unit 1.

The passenger-detection-state indicator lamp 6 is electrically connected to the air-bag control unit 1, and is constructed so that it can indicate no passenger, an adult, or a child based on the passenger-detection-state signal. The lamp 6 may be electrically connected to the passenger detecting device 2.

The warning lamp 8 is electrically connected to the air-bag control unit 1 to receive a fault signal therefrom. The warning lamp 8 lights up to warn a driver a potential malfunction when it receives the fault signal.

The air bag 7 is made of a nylon fabric with a coating on its inside and contains a not-shown pyrotechnic inflater and a not-shown igniter. The air bag 7 can deploy to absorb driver's momentum when the crash sensor detects a sufficient impact acting on the motor vehicle and the seat sensor corresponding to the air bag 7 detects the existence of the passenger. The air bag 7 can be controlled so as to deploy to have at least two different volumes according to the physical size of the passenger.

Figure 3A:
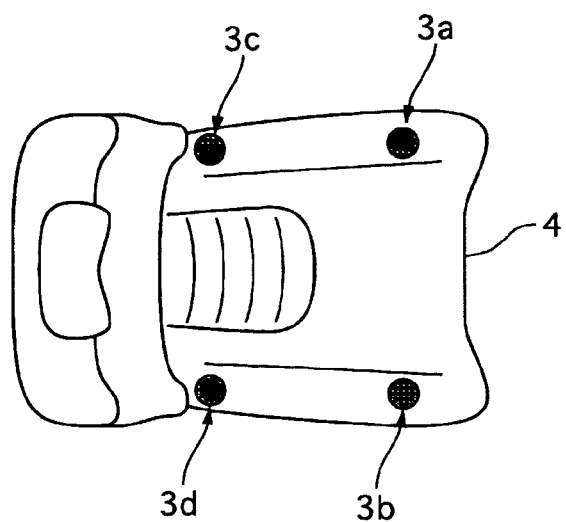
FIG. 3A is a plan view showing the seat having four weight sensors of the passenger detecting device of the embodiment.
Figure 3B:
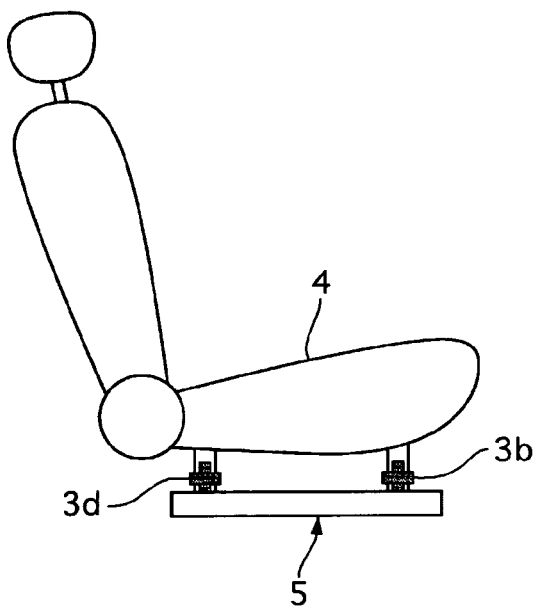
FIG. 3B is a side view showing the seat having the sensors, and the FIG. 3C is a front view showing the seat having the sensors.
Figure 3C:
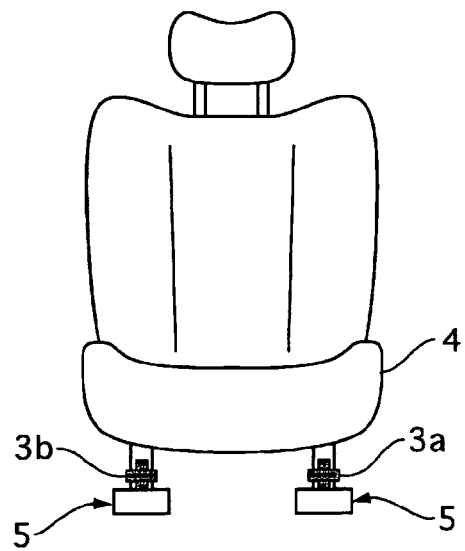

The first to fourth weight sensors 3 to 3d are arranged on four legs of the seat 4, respectively, as shown in FIGS. 3A to 3C. Specifically, the first weight sensor 3a is arranged on a front left leg of the seat 4, the second weight sensor 3b is arranged on a front right leg thereof, the third weight sensor 3d is arranged on a rear left leg thereof, and the fourth weight sensor 3d is arranged on a rear right leg thereof.

The operation of thus-constructed air bag system used in the embodiment will be described.

When the crash sensor detects a sufficient impact and the passenger detecting device 2 detects the existence of the passenger, the air-bag control unit 1 controls the igniter to produce an ignition spark. Fuel tablets burn very rapidly to produce a given quantity of gas and deploy the air bag 7. This volume of the air bag 7 is smaller when the passenger is judged to be a child, while it is larger when the passenger is judged to be an adult. The air bag 7 does not deploy in case of judgment of no existence of a passenger, although the crash sensor detects the sufficient impact.

Next, the operation of the passenger detecting device 2 of the embodiment will be described.

The passenger detecting device 2 receives the first to fourth weight signals from the first to fourth weight sensors 3a to 3d, and judges the passenger on the seat 4 to be an adult or a child.

Figure 4:
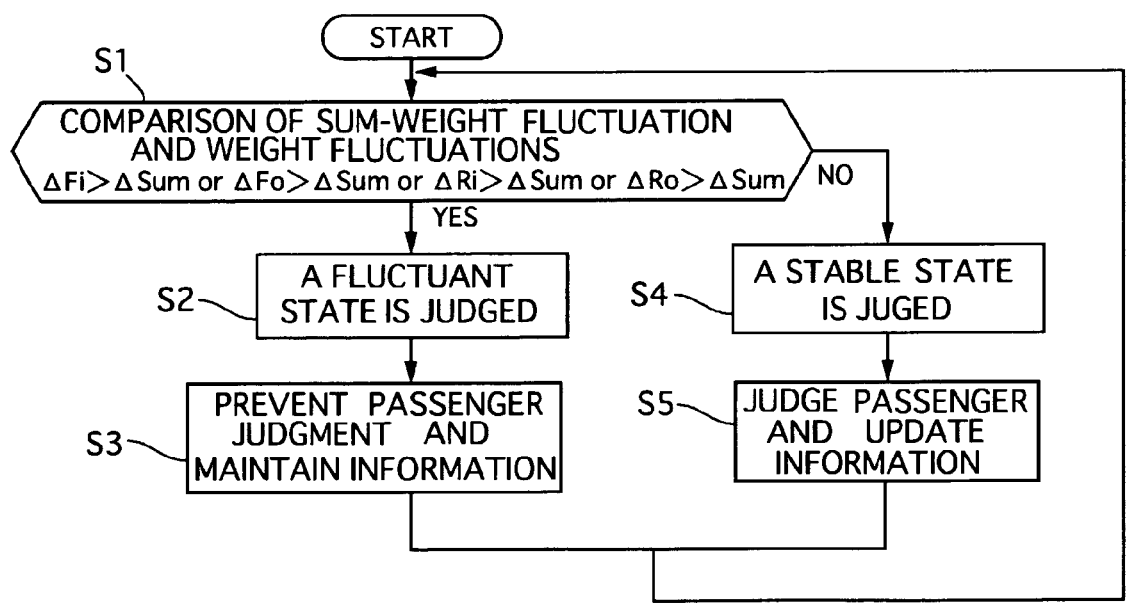
FIG. 4 is a flow chart of a weight-fluctuation monitoring process and a passenger judging and data updating process executed by a control unit of the passenger detecting device.

FIG. 4 shows a flow chart of a weight-fluctuation monitoring process and a passenger judging and data updating process executed by the CPU 21 of the passenger detecting device 2, and its each step will be described. These processes are executed while an ignition key is kept ON. Incidentally, the passenger detecting device 2 and its not-shown program of the weight monitoring process correspond to a weight-fluctuation monitoring means of the present invention. In addition, the passenger detecting device 2 and its not-shown program of the passenger judging and data updating process correspond to a passenger judging and data updating means of the present invention.

At step S1, the passenger detecting device 2 receives the first to fourth signals from the first to fourth weight sensors 3a to 3d to calculate the sum-weight fluctuation amount $\Delta$Sum and each weight fluctuation amounts $\Delta$Fi, $\Delta$Fo, $\Delta$Ri, and $\Delta$R$_o$ of the first to fourth weight sensors 3a to 3d, where $\Delta$Fi is the weight fluctuation amount detected by the first weight sensor 3a at front inner side of the seat 4, ΔFo is the weight fluctuation amount detected by the second weight sensor 3b at a front outer side of the seat 4, ΔRi is the weight fluctuation amount detected by the third weight sensor 3c at a rear left side of the seat 4, and ΔR$_0$ is the weight fluctuation amount detected by the fourth weight sensor 3d at a rear right side of the seat 4. The seat 4 is the front passenger seat 4b in this embodiment, and located at a front right side of the motor vehicle.

Then, the passenger detecting device 2 compares the sum-weight fluctuation amount ΔSum and each weight fluctuation amounts ΔFi, ΔFo, ΔRi, and ΔRo with each other so as to judge whether the motor vehicle is in a stable state or not. If at least one of the weigh fluctuation amounts ΔFi, ΔFo, ΔRi, and ΔRo is larger than the sum-weight fluctuation amount ΔSum, the flow goes to step S2, while, if the sum-weight fluctuation amount ΔSum is equal to one of the weigh fluctuation amounts ΔFi, ΔFo, ΔRi, and ΔRo or larger than all of them, the flow goes to step S4. That is, if ΔFi>ΔSum, or ΔFo>ΔSum, or ΔRi>ΔSum, or ΔRo>ΔSum, then the motor vehicle is judged to be in the fluctuant state. Note that the above fluctuation amounts and the sum-fluctuation amount are used as absolute values in these comparisons.

At the step S2, the passenger detecting device 2 judges the motor vehicle to be in a fluctuant state, and then the flow goes to step S3.

At the step S3, the passenger detecting device 2 is prevented from judging a passenger to be an adult or a child, and maintains stored information on the passenger, and then returns to the step S1.

At the step S4, the passenger detecting device 2 judges the motor vehicle to be in a stable state, and then the flow goes to step S5.

At the step S5, the passenger detecting device 2 judges the passenger to be an adult or a child to update the information on the driver, and then the flow returns to the step S1.

The passenger process will be explained using examples of various motor vehicle states.

First, the judging process, executed when the motor vehicle parks or runs on a flat road at a substantially constant speed, will be described.

The output values of the first to fourth weight sensors 3a to 3d are stable to provide well-rounded small fluctuation amounts, each of which becomes equal to or smaller than the sum-weight fluctuation amount ΔSum. I this state, the motor vehicle is judged to be in the stable state, and the information on the passenger is updated, thus providing a proper judgment result on the passenger. Therefore, the air bag 7 can be deployed properly according to the detected physical size of the passenger.

Next, the judging process, executed when the motor vehicle runs on a curved road, will be described with reference to FIGS. 5A to 5C and 6.

Figure 6:
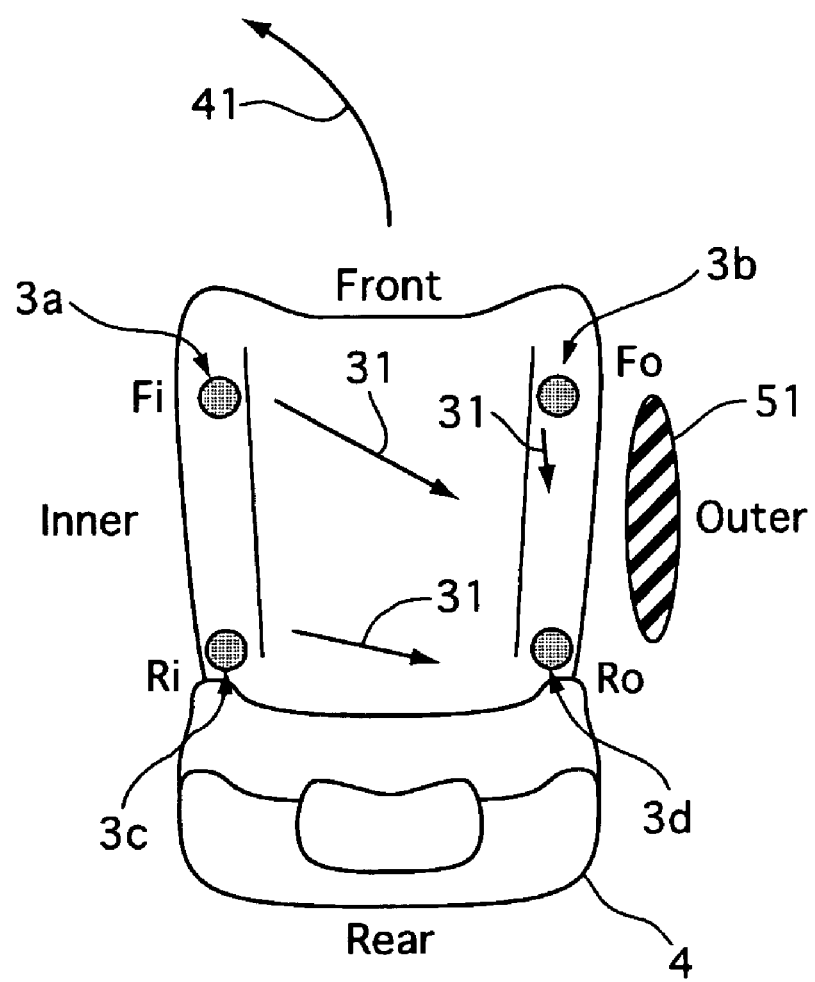
FIG. 6 is a plan view showing weight shift on the seat, a state of the passenger and a movement direction of the motor vehicle when the motor vehicle runs on the curved road.

As show in FIG 6, when the motor vehicle is running around the curve in a direction indicated by an arrow 41, centrifugal force acts on the passenger in a right direction FIG. 6, and consequently the weigh shift of the passenger generates as indicated by arrows 31. This increases weight detected by the fourth weight sensor 3d. At the same time, a part of the passenger's body may lean over on a front right door, not shown, as indicated by a zone 51, and accordingly a part of the passenger's weight is supported by the front right door.

Therefore, while the motor vehicle is running round the curve, the outputs values of the first to fourth sensors 3a to 3d largely change to disrupt a balance of the left side weights and the right side weights. However, the sum weight is kept to have an amount close to that obtained when the motor vehicle runs on the flat road at a the substantially constant speed, although it is decreased by an amount of the weight supported by the door.

FIG. 5A shows an example of the weights obtained when the motor vehicle parks or runs on the flat road at the substantially constant speed, and FIG. 5B shows an example of the weights obtained when the motor vehicle is running round the curve.

As shown in FIG. 5A, when the motor vehicle parks or runs on the flat road at the substantially constant speed, the first to fourth weight sensors 3a to 3d detect the weights acting on the seat 4, for example, Fi=8, Fo=8, Ri=12, Ro=12, and the sum weight Sum=40. On the other hand, as shown in FIG. 5B, when the motor vehicle is running round the curve, the first to fourth weight sensors 3a to 3d detect the weights acting on the seat 4, for example, Fi=0, Fo=13, Ri=−4, Ro=29, and the sum weight Sum=38.

Accordingly, at the step S1 of the judging process, the weight fluctuation amounts become as follows. ΔSum=2, ΔFi=8, ΔFo=8, ΔRi=16, and ΔRo=17 as shown in FIG. 5C. The sum-weight fluctuation amount ΔSum becomes to be smaller than each of the weight fluctuation amounts ΔFi, ΔFo, ΔRi, and ΔRo. Therefore, the passenger detecting device 2 judges the motor vehicle to be in the fluctuant state, and prevents judging the passenger to maintain the previously stored information on the passenger. This can prevent the air bag 7 from being deployed by mistake, such that an adult is judged to be a child.

Next, the judging process, executed when the motor vehicle is suddenly stopped or braked, will be described with reference to FIGS. 7A to 7C and 8.

Figure 8:
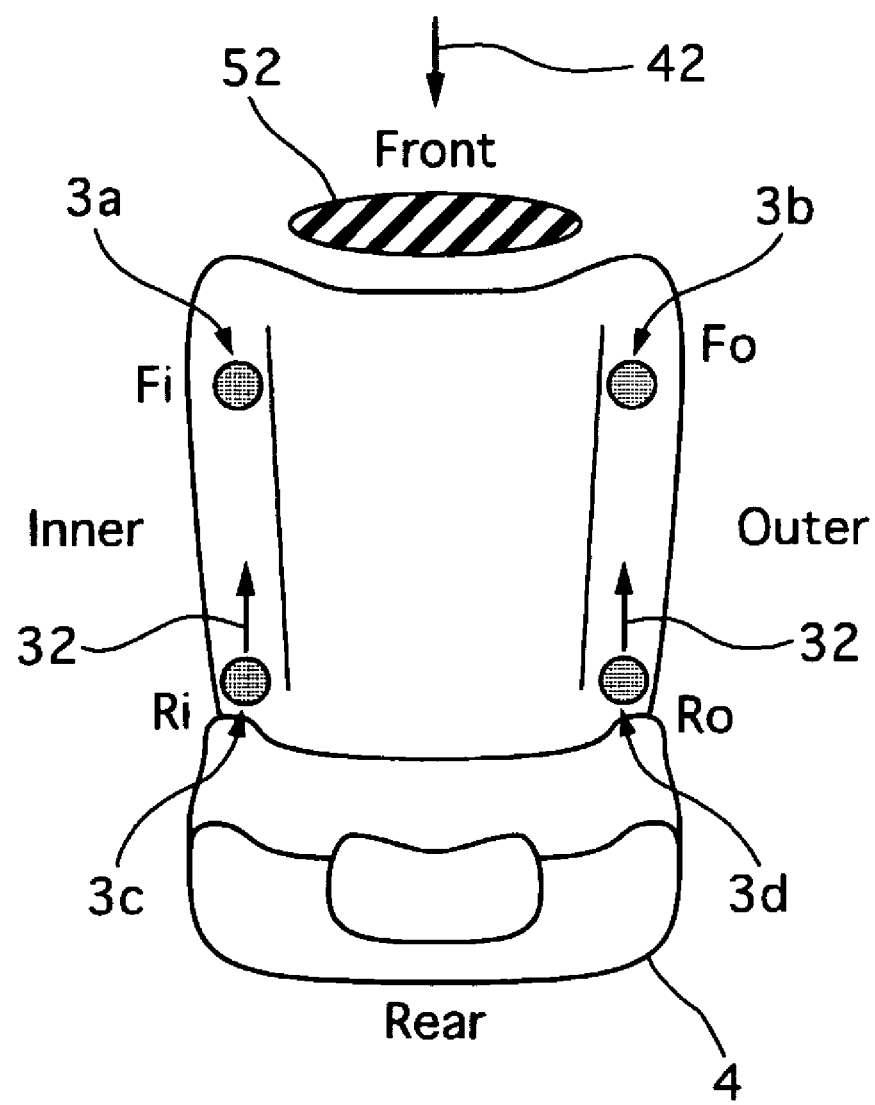
FIG. 8 is a plan view showing the weight shift, the state of the passenger and a direction of brake force acting on the motor vehicle when it makes a sudden stop.

As shown in FIG. 8, when the motor vehicle is suddenly stopped or braked, brake force acts on the motor vehicle in a direction indicated by an arrow 42, and consequently the weigh shift of the passenger generates as indicated by arrows 32. This increases weight detected by the first and second weight sensors 3a and 3b. At the same time, legs of the passenger may support a part of his or her weight as indicated by a zone 52, and accordingly a part of the passenger's weight is supported by a floor, not shown, of the motor vehicle.

Therefore, while the motor vehicle is suddenly stopped or braked, the outputs values of the first to fourth sensors 3a to 3d largely change to disrupt a balance of the front side weights and the rear side weights. However, the sum weight is kept to have an amount close to that obtained when the motor vehicle runs on the flat road at the substantially constant speed, although it is decreased by an amount of the weight supported by the door.

FIG. 7A shows an example of the weights obtained when the motor vehicle parks or runs on the flat road at the substantially constant speed, and FIG. 7B shows an example of the weights obtained when the motor vehicle is suddenly stopped or braked.

As shown in FIG. 7A, when the motor vehicle parks or runs on the flat road at the substantially constant speed, the first to fourth weight sensors 3a to 3d detect the weights acting on the seat 4, for example, Fi=8, Fo=8, Ri=12, Ro=12, and the sum weight Sum=40. On the other hand, as shown in FIG. 7B, when the motor vehicle is suddenly stopped or braked, the first to fourth weight sensors 3a to 3d detect the weights acting on the seat 4, for example, Fi=17, Fo=16, Ri=2, Ro=3, and the sum weight Sum=38.

Accordingly, at the step S1 of the judging process, the weight fluctuation amounts become as follows. ΔSum=2, ΔFi=10, ΔFo=7, ΔRi=9, and ΔRo=6 as shown in FIG. 7C. The sum-weight fluctuation amount ΔSum becomes to be smaller than each of the weight fluctuation amounts ΔFi, ΔFo, ΔRi, and ΔRo. Therefore, the passenger detecting device 2 judges the motor vehicle to be in the fluctuant state, and prevents judging the passenger to maintain the previously stored information on the passenger. This can prevent the air bag 7 from being deployed by mistake, such that an adult is judged to be a child.

When the motor vehicle is suddenly started or accelerated, the shift of the weights becomes to have a direction opposite to that generated when the motor vehicle is suddenly stopped or braked. In this case, the passenger detecting device 2 similarly judges the motor vehicle to be in the fluctuant state, and prevents judging the passenger and maintains the previously stored information on the passenger. This can prevent the air bag 7 from being deployed by mistake, such that an adult is judged to be a child.

Next, the judging process, executed when passengers change from one to another on the seat 4, will be described with reference to FIGS. 9A to 9C.

In this case, the one passenger leaves the seat 4, and then the other passenger sits on the seat 4. This causes change of the weights detected by the first to fourth weight sensors 3a to 3d.

FIG. 9A shows an example of the weights obtained when the motor vehicle parks or runs on the flat road at the substantially constant speed, and FIG. 9B shows an example of the weights obtained after the passengers change on the seat 4.

As shown in FIG. 9A, when the motor vehicle parks or runs on the flat road at the substantially constant speed, the first to fourth weight sensors 3a to 3d detect the weights acting on the seat 4, for example, Fi=8, Fo=8, Ri=12, Ro=12, and the sum weight Sum=40. On the other hand, as shown in FIG. 7B, when the passenger leaves the seat 4, the first to fourth weight sensors 3a to 3d detect the weights acting on the seat 4, for example, Fi=0, Fo=0, Ri=0, Ro=0, and the sum weight Sum=0.

Accordingly, at the step S1 of the judging process, the weight fluctuation amounts become as follows. ΔSum=40, ΔFi=8, ΔFo=8, ΔRi=12, and ΔRo=12 as shown in FIG. 9C. The sum-weight fluctuation amount ΔSum becomes to be larger than each of the weight fluctuation amounts ΔFi, ΔFo, ΔRi, and ΔRo. Therefore, the passenger detecting device 2 judges the motor vehicle to be in the stable state, and judges the passenger to update the information on the passenger. Then, when the other passenger sits on the seat 4, the sum-fluctuation amount becomes to be larger than each of the weight fluctuation amounts detected by the first to fourth weight sensors 3a to 3d. Therefore, the passenger detecting device 2 judges the motor vehicle to be in the stable state, and judges the passenger to update the information on the passenger. This can deploy the air bag 7 according to the physical size of this new passenger in the event of a serious accident.

Next, the judging process, executed when a child having his or her heavy luggage sits on the seat 4, will be described with reference to FIGS. 10A to 10C.

This case is that the child gets in the motor vehicle and sits on the seat 4 with the heavy luggage, and then the first to fourth weight sensors 3a to 3d detect weight of the child and the luggage. In this case, a passenger on the seat 4 is judged to be an adult, so that the volume of air bag 7 when it deploys is for an adult size. This is acceptable because of increase in volume of the child and the luggage.

On the other hand, after the passenger detecting device 2 judges the passenger to be an adult, the luggage may be moved off from the seat 4. In this case, the weight acting on the seat 4 decreases, and accordingly the passenger detecting device 2 judges the passenger to be a child to update the information on the passenger. Therefore, the air bag 7 is deployed to have a child volume in the event of an accident.

FIG. 10A shows an example of the weights obtained when the child with the luggage is detected as the weight of the passenger on the seat 4, and FIG. 10B shows an example of the weights obtained after the child without the luggage, because of moving it off from the seat 4, is detected as the weight of the passenger on the seat 4.

As shown in FIG. 10A, when the child with the luggage is detected as the weight of the passenger on the seat 4, the first to fourth weight sensors 3a to 3d detect the weights acting on the seat 4, for example, Fi=6, Fo=6, Ri=10, Ro=10, and the sum weight Sum=32. On the other hand, as shown in FIG. 10B, when the child without the luggage is detected as the weight of the passenger on the seat 4, the first to fourth weight sensors 3a to 3d detect the weights acting on the seat 4, for example, Fi=5, Fo=5, Ri=8, Ro=8, and the sum weight Sum=26.

Accordingly, at the step S1 of the judging process, the weight fluctuation amounts become as follows. ΔSum=6, ΔFi=1, ΔFo=1, ΔRi=2, and ΔRo=2 as shown in FIG. 10C. The sum-weight fluctuation amount ΔSum becomes to be larger than each of the weight fluctuation amounts ΔFi, ΔFo, ΔRi, and ΔRo. Therefore, the passenger detecting device 2 judges the motor vehicle to be in the stable state, and judges the passenger to be a child to update the previously stored information on the passenger. This enables the air bag 7 to deploy to have a volume suitable for the child.

The passenger detecting device 2 of the embodiment has the following advantages.

The passenger detecting device 2 of the embodiment includes the first to fourth weight sensors 3a to 3d for detecting the weights acting on different portions of the seat 4, and monitors the weight fluctuation amounts ΔFi, ΔFo, ΔRi, and ΔRo and the sum-weight fluctuation amount ΔSum to judge the passenger based thereon. When at least one of the weight fluctuation amounts ΔFi, ΔFo, ΔRi, and ΔRo is larger than the sum-weight fluctuation amount ΔSum, the passenger judging process is prevented, thus maintaining the previous stored information on the passenger. Therefore, the passenger detecting device 2 of the embodiment can prevent a wrong judgment of the passenger during the curving, the sudden acceleration, the sudden braking and the like of the motor vehicle, thereby preventing the air bag 7 to be deployed to have an undesirable volume.

On the contrary, when all of the weight fluctuation amounts ΔFi, ΔFo, ΔRi, and ΔRo is equal to or smaller than the sum-weight fluctuation amount ΔSum, the passenger judging process is executed, thus the information being updated. Therefore, the passenger detecting device 2 of the embodiment can properly judge the passenger to update the information on the passenger when the passengers change and when the child moves the luggage from the seat 4.

Thus, the passenger detecting device 2 of the embodiment can more stably and properly detect the passenger to be an adult or a child and desirably control deployment of the air bag 7.

While there have been particularly shown and described with reference to preferred embodiments thereof, it will be understood that various modifications may be made therein, and it is intended to cover in the appended claims all such modifications as fall within the true spirit and scope of the invention.

The first to fourth weight sensors 3a to 3d may employ a strain gauge transducer, a hydraulic type weight sensor, or others which can directly or indirectly detectable the weight, as long as it can accurately detect the weight of a passenger on a seat.

In the embodiment, the four weight sensors $3a$ to $3d$ are used, while the number of the weight sensors may be changed.

In the embodiment, the weight sensors $3a$ to $3d$ are provided on the front passenger seat $4b$, while they may be provided on another seat or on other seats.

In the embodiment, when at least one of the weight fluctuation amounts $\Delta Fi$, $\Delta Fo$, $\Delta Ri$, and $\Delta Ro$ is larger than the sum-weight fluctuation amount $\Delta Sum$, the passenger judging process is prevented, while in this case the passenger judging process may be executed as long as the information on the passenger is not updated.

The entire contents of Japanese Patent Application No. 2005-369743 filed Dec. 22, 2005 are incorporated herein by reference.

What is claimed is:

1. A passenger detecting device adapted for a motor vehicle, the passenger detecting device comprising:
    a plurality of weight sensors that are arranged at different positions of a seat for respectively detecting weights acting on the seat of a motor vehicle;
    a weight-fluctuation monitoring means for monitoring weight-fluctuation amounts of the plurality of the weight sensors and a sum-weight fluctuation amount thereof, based on the weights detected by the plurality of the weight sensors, respectively; and
    a passenger judging and data updating means for judging a passenger on the seat to be a large physical-size person or a small physical-size person to update information on the passenger on the seat when the sum-weight fluctuation amount is not less than each of the weight fluctuation amounts, the passenger judging and data updating means for preventing the information to be updated when at least one of the weight fluctuation amounts is larger than the sum-weight fluctuation amount.

2. The passenger detecting device according to claim 1, wherein the plurality of the weight sensors are located at a front left position, a front right position, a rear left position and a rear right position of the seat, respectively.

3. The passenger detecting device according to claim 2, wherein the plurality of the weight sensors are located on legs of the seat.

4. The passenger detecting device according to claim 1, wherein the plurality of the weight sensors are located on legs of the seat.

5. A passenger detecting method, adapted for a motor vehicle, comprising the steps of:
    detecting weights acting on a seat of a motor vehicle by a plurality of weight sensors that are arranged at different positions of the seat, respectively;
    monitoring weight-fluctuation amounts of the plurality of the weight sensors and a sum-weight fluctuation amount thereof, based on the weights detected by the plurality of the weight sensors, respectively; and
    judging a passenger on the seat to be a large physical-size person or a small physical-size person to update information on the passenger on the seat when the sum-weight fluctuation amount is not less than each of the weight fluctuation amounts and preventing the information to be updated when at least one of the weight fluctuation amounts is larger than the sum-weight fluctuation amount.

6. The passenger detecting method according to claim 5, wherein the plurality of the weight sensors are located at a front left position, a front right position, a rear left position and a rear right position of the seat, respectively.

7. The passenger detecting method according to claim 6, wherein the plurality of the weight sensors are located on legs of the seat.

8. The passenger detecting method according to claim 5, wherein the plurality of the weight sensors are located on legs of the seat.

* * * * *